(12) United States Patent
Stanfield et al.

(10) Patent No.: US 9,858,567 B2
(45) Date of Patent: *Jan. 2, 2018

(54) DYNAMIC CARD VERIFICATION VALUES AND CREDIT TRANSACTIONS

(71) Applicant: Intersections Inc., Chantilly, VA (US)

(72) Inventors: Michael Stanfield, The Plains, VA (US); George Tsantes, Great Falls, VA (US); Joe Vacca, Lovettsville, VA (US)

(73) Assignee: Intersections Inc., Chantilly, VA (US)

( * ) Notice: Subject to any disclaimer, the term of this patent is extended or adjusted under 35 U.S.C. 154(b) by 740 days.

This patent is subject to a terminal disclaimer.

(21) Appl. No.: 14/065,192

(22) Filed: Oct. 28, 2013

(65) Prior Publication Data

US 2015/0120538 A1 Apr. 30, 2015
US 2015/0371220 A9 Dec. 24, 2015

Related U.S. Application Data

(63) Continuation of application No. 12/732,349, filed on Mar. 26, 2010, now Pat. No. 8,567,670.

(60) Provisional application No. 61/163,972, filed on Mar. 27, 2009, provisional application No. 61/308,493, filed on Feb. 26, 2010.

(51) Int. Cl.
| | |
|---|---|
| G06K 7/00 | (2006.01) |
| G06Q 20/36 | (2012.01) |
| G06Q 20/24 | (2012.01) |
| G06Q 20/34 | (2012.01) |
| G06Q 20/38 | (2012.01) |
| G06Q 20/40 | (2012.01) |
| G07F 7/10 | (2006.01) |
| G07F 7/12 | (2006.01) |

(52) U.S. Cl.
CPC ......... *G06Q 20/3674* (2013.01); *G06Q 20/24* (2013.01); *G06Q 20/341* (2013.01); *G06Q 20/385* (2013.01); *G06Q 20/4018* (2013.01); *G07F 7/10* (2013.01); *G07F 7/12* (2013.01)

(58) Field of Classification Search
USPC .................. 235/375, 379, 380; 705/5, 35–45
See application file for complete search history.

(56) References Cited

U.S. PATENT DOCUMENTS

| | | |
|---|---|---|
| 5,987,438 A | 11/1999 | Nakano et al. |
| 6,073,238 A | 6/2000 | Drupsteen |
| 6,402,039 B1 | 6/2002 | Freeman et al. |

(Continued)

FOREIGN PATENT DOCUMENTS

| | | |
|---|---|---|
| CA | 2697075 A1 | 2/2009 |

OTHER PUBLICATIONS

Jun. 28, 2013—(US) Notice of Allowance—U.S. Appl. No. 12/732,349.

(Continued)

*Primary Examiner* — Matthew Mikels
(74) *Attorney, Agent, or Firm* — Banner & Witcoff, Ltd.

(57) ABSTRACT

A system and method for providing card verification values for card-not-present transactions is described. In one example, a user's computing device stores single-use CVVs to be provided from a secure wallet. The secure wallet may be software running on the user's computing device. Alternatively, it may be an external device connectable to the user's computing device, which accesses the external device to obtain the single-use CVV.

20 Claims, 8 Drawing Sheets

(56) References Cited

U.S. PATENT DOCUMENTS

| | | | |
|---|---|---|---|
| 7,431,202 B1* | 10/2008 | Meador | G06Q 20/32 |
| | | | 235/379 |
| 7,458,508 B1 | 12/2008 | Shao et al. | |
| 7,562,814 B1 | 7/2009 | Shao et al. | |
| 7,686,214 B1 | 3/2010 | Shao et al. | |
| 8,567,670 B2* | 10/2013 | Stanfield | G06Q 20/24 |
| | | | 235/380 |
| 2005/0043997 A1 | 2/2005 | Sahota et al. | |
| 2006/0049256 A1 | 3/2006 | von Mueller et al. | |
| 2006/0124756 A1 | 6/2006 | Brown | |
| 2006/0159124 A1 | 7/2006 | Henry et al. | |
| 2006/0259390 A1* | 11/2006 | Rosenberger | G06Q 20/04 |
| | | | 705/35 |
| 2007/0067833 A1 | 3/2007 | Colnot | |
| 2007/0136211 A1 | 6/2007 | Brown et al. | |
| 2007/0208671 A1 | 9/2007 | Brown et al. | |
| 2007/0294182 A1 | 12/2007 | Hammad | |
| 2008/0005037 A1 | 1/2008 | Hammad et al. | |
| 2008/0017704 A1 | 1/2008 | VanDeburg et al. | |
| 2008/0029593 A1 | 2/2008 | Hammad et al. | |
| 2008/0034221 A1* | 2/2008 | Hammad | G06Q 20/085 |
| | | | 713/190 |
| 2008/0040271 A1 | 2/2008 | Hammad et al. | |
| 2008/0040276 A1 | 2/2008 | Hammad et al. | |
| 2008/0058014 A1 | 3/2008 | Khan et al. | |
| 2008/0065553 A1 | 3/2008 | Faith et al. | |
| 2008/0110983 A1* | 5/2008 | Ashfield | G06Q 20/24 |
| | | | 235/382 |
| 2008/0120236 A1 | 5/2008 | Faith et al. | |
| 2008/0126251 A1 | 5/2008 | Wassingbo | |
| 2008/0126262 A1* | 5/2008 | Brady | G06Q 20/04 |
| | | | 705/75 |
| 2008/0197201 A1 | 8/2008 | Manessis et al. | |
| 2008/0203152 A1 | 8/2008 | Hammad et al. | |
| 2008/0203170 A1 | 8/2008 | Hammad et al. | |
| 2008/0222038 A1* | 9/2008 | Eden | G06Q 20/04 |
| | | | 705/44 |
| 2009/0006262 A1 | 1/2009 | Brown et al. | |
| 2009/0030845 A1 | 1/2009 | Hurry et al. | |
| 2009/0055893 A1 | 2/2009 | Manessis et al. | |
| 2009/0068982 A1* | 3/2009 | Chen | G06Q 20/108 |
| | | | 455/407 |
| 2009/0083159 A1 | 3/2009 | Maw | |
| 2009/0083191 A1 | 3/2009 | Hammad | |
| 2009/0089213 A1 | 4/2009 | Hammad | |
| 2009/0119213 A1 | 5/2009 | Hammad et al. | |
| 2009/0121016 A1 | 5/2009 | Hammad et al. | |
| 2009/0134218 A1 | 5/2009 | Yuzon et al. | |
| 2009/0150295 A1 | 6/2009 | Hatch et al. | |
| 2009/0164322 A1 | 6/2009 | Khan et al. | |
| 2009/0171849 A1 | 7/2009 | Hammad | |
| 2009/0173782 A1* | 7/2009 | Muscato | G06Q 20/10 |
| | | | 235/379 |
| 2009/0200371 A1 | 8/2009 | Kean et al. | |
| 2009/0204525 A1 | 8/2009 | Phillips | |
| 2009/0266881 A1 | 10/2009 | Hammad | |
| 2009/0271211 A1 | 10/2009 | Hammad | |
| 2009/0319287 A1 | 12/2009 | Hammad et al. | |
| 2009/0319430 A1 | 12/2009 | Faith et al. | |
| 2009/0319784 A1 | 12/2009 | Faith et al. | |
| 2010/0023453 A1 | 1/2010 | Keresman, III et al. | |
| 2010/0027786 A1 | 2/2010 | Faith et al. | |
| 2010/0065629 A1 | 3/2010 | Wentker et al. | |
| 2010/0258625 A1 | 10/2010 | Stanfield et al. | |
| 2012/0131656 A1 | 5/2012 | Slaton et al. | |
| 2013/0268437 A1 | 10/2013 | Desai et al. | |
| 2014/0006277 A1 | 1/2014 | Rao | |

OTHER PUBLICATIONS

May 11, 2015—(CA) Office Action—App. No. 2,697,921.
May 4, 2015—(CA) Examination Search Report—App. No. 2,697,921.
Coskun et al., "Can "Something You Know" Be Saved?," ISC 2008, LNCS 5222, p. 421-440, http://research.microsoft.com/pubs/74161/ISC08a.pdf.
May 4, 2016—(CA) Examiner Requisition—App 2,697,921.
Apr. 11, 2017—(CA) Office Action—App. No. 2,697,921.
Jun. 17, 2015—(PCT) International Search Report and Written Opinion—App PCT/US2015/020566.

* cited by examiner

DYNAMIC CARD VERIFICATION VALUES AND CREDIT TRANSACTIONS

CROSS-REFERENCE TO RELATED APPLICATIONS

This application is a continuation of co-pending U.S. application Ser. No. 12/732,349, filed Mar. 26, 2010, which claims priority from U.S. provisional application Nos. 61/163,972, filed Mar. 27, 2009, and 61/308,493, filed Feb. 26, 2010, whose contents are expressly incorporated herein by reference.

RELATED ART

Credit card users are becoming increasingly aware of credit card fraud as identity theft and other crimes increase. While users may be able to prove to merchants and banks that they were not responsible for credit card charges and ultimately be not responsible for unauthorized charges, the hassle, lost opportunity costs, reduction in credit scores, and potential for long-term litigation can make credit card users wary of providing credit card information in-person or online.

Some credit card systems require authorization of the user and merchant. However, authorization of a given merchant is not protection that someone at the merchant (or someone monitoring a transaction) may abscond with a user's credit card number and associated verification information.

SUMMARY

Aspects of the invention relate to increasing security for credit card transactions. In some aspects, a dynamic card verification value may be provided in a secure fashion to a merchant and/or user. These and other aspects are described below.

DETAILED DESCRIPTION

Aspects of the invention relates generally to providing a card verification value for credit card transactions.

It is noted that various connections are set forth between elements in the following description. It is noted that these connections in general and, unless specified otherwise, may be direct or indirect and that this specification is not intended to be limiting in this respect.

Figure 1:
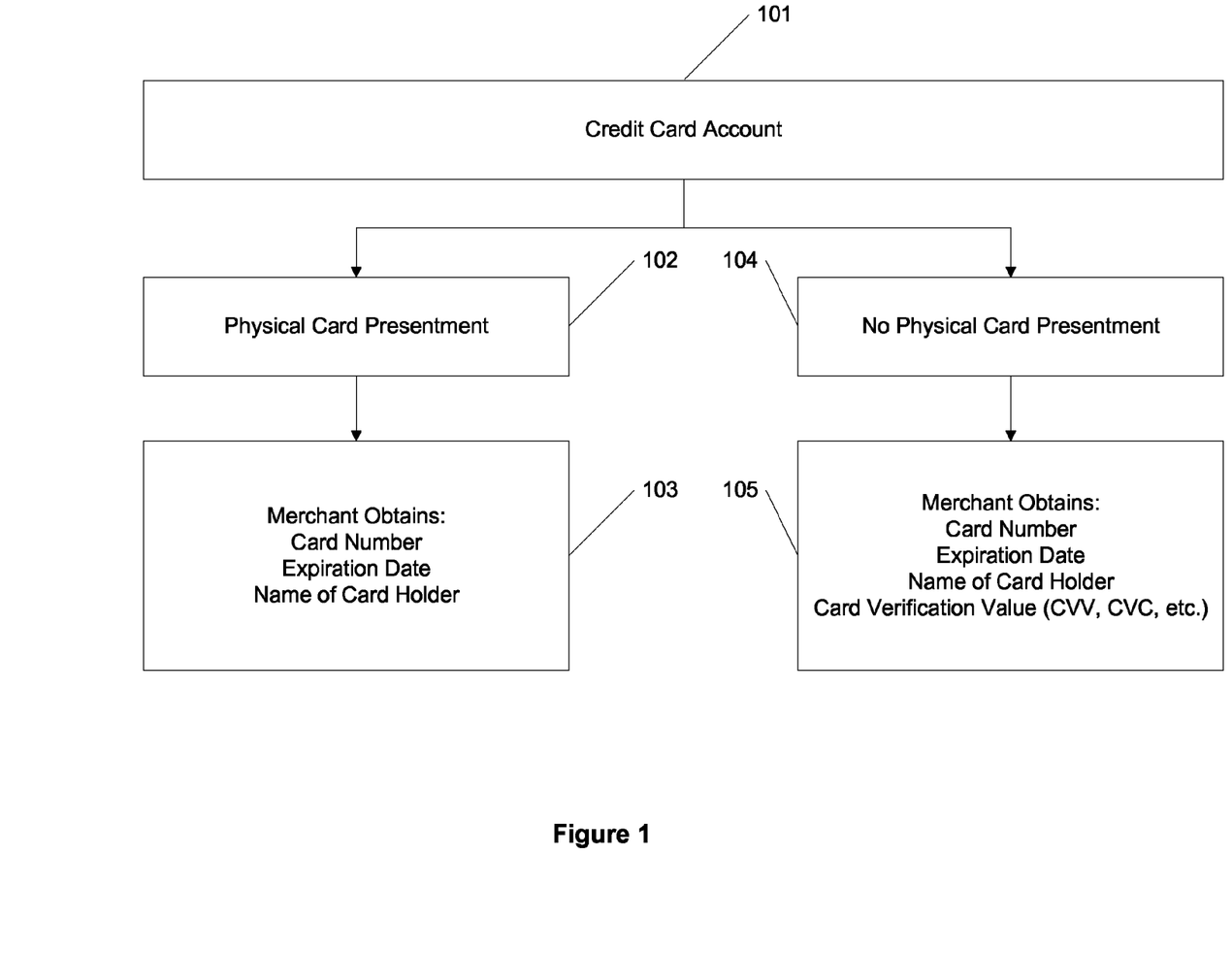
FIG. 1 shows a credit card account in accordance with one or more aspects of the invention.

FIG. 1 shows a credit card account in accordance with one or more aspects of the invention. A card issuer may provide a cardholder with a credit card account 101. Credit card account 101 may include a one or more credit cards that may be used for in-person credit card transactions 102 and card-not-present credit card transactions 104. As used herein, card-not-present credit card transactions 104 may include online purchases, off-line form-based transactions (for instance, fax and paper mail-based transactions), recurring transactions, and the like.

A customer account number may have two credit cards: a virtual card and a physical card. In one example, the virtual card and the physical card may have the same credit card number. Alternatively, the virtual card and the physical card may have different credit card numbers. In this latter example, different credit card numbers may provide greater security and flexibility for the customer's account as loss of the physical card does not jeopardize the customer's use of the virtual card.

Also, the virtual card may be able to access supplemental accounts. Similarly, the physical card may access its own supplemental accounts. These supplemental accounts can provide the user with additional flexibility in the overall customer's account by permitting the user to designate a supplemental account for a specific purpose (e.g., mortgage payments, car payments, and the like) and/or for a specific amount.

The virtual card may be used for online purchases and recurring payments.

In physical card presentment transactions 102, a merchant obtains a credit card number, expiration date, and the name of the cardholder in step 103 to verify the credit card and, if the merchant asks for additional identification, to verify the identity of the cardholder.

In card-not-present transactions 104, a merchant obtains the credit card number, expiration date, name of the cardholder, and a card verification value CVV of the card as a way of verifying that the cardholder has the physical card in possession. Card verification values are also referred to as CV2, card security code CSC, card verification value code CVVC, verification code (V-code or V code), and card code verification CCV. For purposes of explanation, the term CVV is used for simplicity and is intended to cover the above card verification codes.

In some situations, in-person credit card transactions may be processed as card-not-present transactions when, for instance, a merchant's transaction terminal cannot read a magnetic strip on a user's card. If the merchant keys in the credit card number and the CVV of the card, that transaction may be processed as a card-not-present transaction as opposed to an in-person credit card transaction.

Both merchants and cardholders may be wary of each other in card-not-present transactions as, to the cardholder, these transactions may provide a greater degree of risk that the user's credit card information may be captured and used without authorization and as, to the merchant, these transactions may be based on illegally obtained credit card information. While the merchant may provide goods or services to the card user, the merchant may find out too late that the card transaction was fraudulent and the merchant is refused payment (or settlement) from the card issuer for the sold goods or services.

One or more aspects relate to providing enhanced security for card-not-present transactions by providing a dynamic card verification value to be used with a single transaction.

Figure 2:
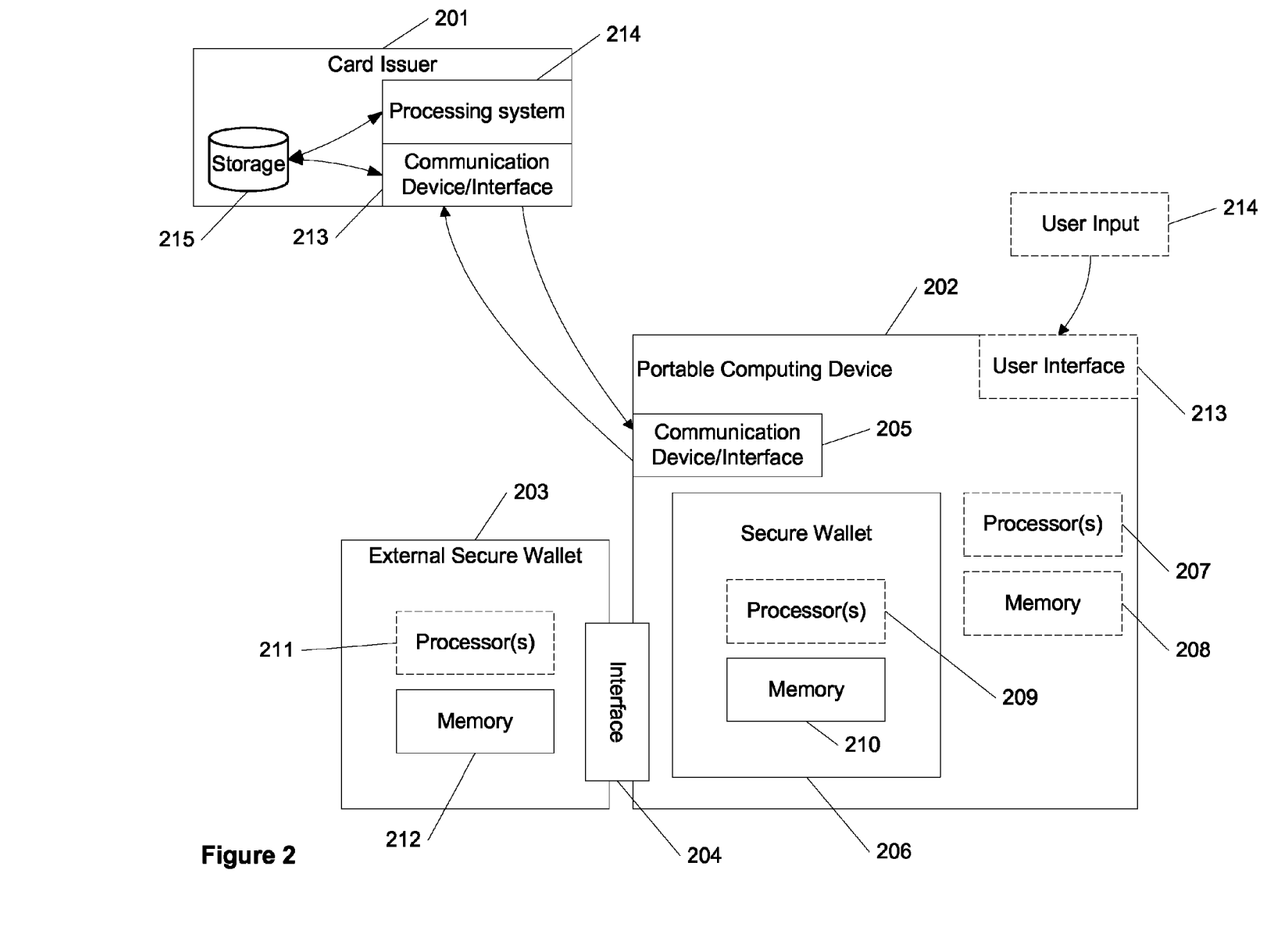
FIG. 2 shows interactions between a card issuer and a user's computing device in accordance with one or more aspects of the invention.

FIG. 2 shows interactions between a card issuer and a user's computing device in accordance with one or more aspects of the invention. FIG. 2 shows a card issuer 201 and a user's computing device 202. The user's portable computing device 202 may include a personal data assistant (PDA), Smart phone, or other portable computing device as known in the art. For instance, the user's computing device 202 may include a notebook computer, a cell phone with data capabilities, a handheld computing device with cellular capabilities, and the like. In another example, the user's computing device may also include a desktop computer, set top cable/satellite television box, gaming console, and other computing environments. In yet another example, the user may not own the computing device 202 but rather be only using the computing device 202 for a short period (for example, at an internet café).

Various examples and embodiments of the present invention are described with respect to one or more secure wallets. One of the wallets may be an external secure wallet 203. Another of the wallets may be an internal secure wallet 206. For purposes of explanation, both external wallet 203 and internal secure wallet 206 are described in the various embodiments. In some situations, external wallet 203 and internal secure wallet 206 may be used together or may be present to a user's portable computing device 202. It is appreciated, however, that only one of the wallets 203 or 206 may be present for use by a user. The wallets may be entirely encrypted software, firmware, hardware, or any combination thereof. For example, a secure processor requiring authentication before access may include various levels of encryption (e.g., using AES, Triple-DES, etc.). In one example, all data stored in a memory may be encrypted. In another example, only some of the information may be encrypted. Further, with respect to software, various functions may be embodied as software modules executed by a computer that control the computer to perform the functions. Examples of computer-readable media include hard drives, flash memory, other dynamic memory, and other static memory as known in the art.

External secure wallet 203 includes a memory 212 and an interface 204. External secure wallet 203 and optionally include one or more processors 211 to further enhance the security of the external secure wallet 203. For instance, the external secure wallet 203 may require various levels of authentication before it provides data to the user's computing device 202 via interface 204. For instance, external secure wallet 203 may be a flash memory device having a USB interface as interface 204. Similarly, external secure wallet 203 may be a variety of other external memory devices including, for instance, SD cards, Sony MEMORYSTOCK™, external hard drives, key fobs, and the like, each with one or more varieties of interfaces 204. While processor 211 is not required to be present on external secure wallet 203, some card issuers 201 may find enhanced security through separate authentication and other encryption/decryption capabilities to be useful in protecting credit card information.

User's computing device 202 may include secure wallet 206 running as purely software or as a combination of software and hardware. For instance, internal secure wallet 206 may include secure memory 210 that requires authentication for access to the contents within memory 210. In another example, the secure wallet may include a processor 209 that controls access to memory 210. In a further example, the user's computing device may include one or more processors 207 and/or memory 208. In this further example, the user's computing device may permit unsecured operations to occur in processor 207 and memory 208 without needing to access secure wallet 206 and/or external secure wallet 203.

User's computing device 202 may include a user interface 213 to receive user input 214 from a user. User interface 213 may include, for example, a microphone and speaker (for voice authentication), a numeric keypad, a display with one or more fields, accelerometers, one or more cameras, and the like. In some examples, user interface 213 may capture biometric information (iris scan, fingerprint, voice authentication (mentioned above) to provide enhanced authentication features to the internal or external secure wallets. One or more of these items may be used to provide a level of authentication (or multiple levels of authentication) to permit user access to at least one of internal secure wallet 206 and external secure wallet 203. The input from the user interface 213 may be compared with locally stored information or remotely obtained information to determine if the user is the authorized user of the device. Further, for enhanced security, the input from the user interface 213 may be sent to a remote site (for example, to the card issuer or other remote entity) to authenticate the user as the authorized user.

Figure 8:
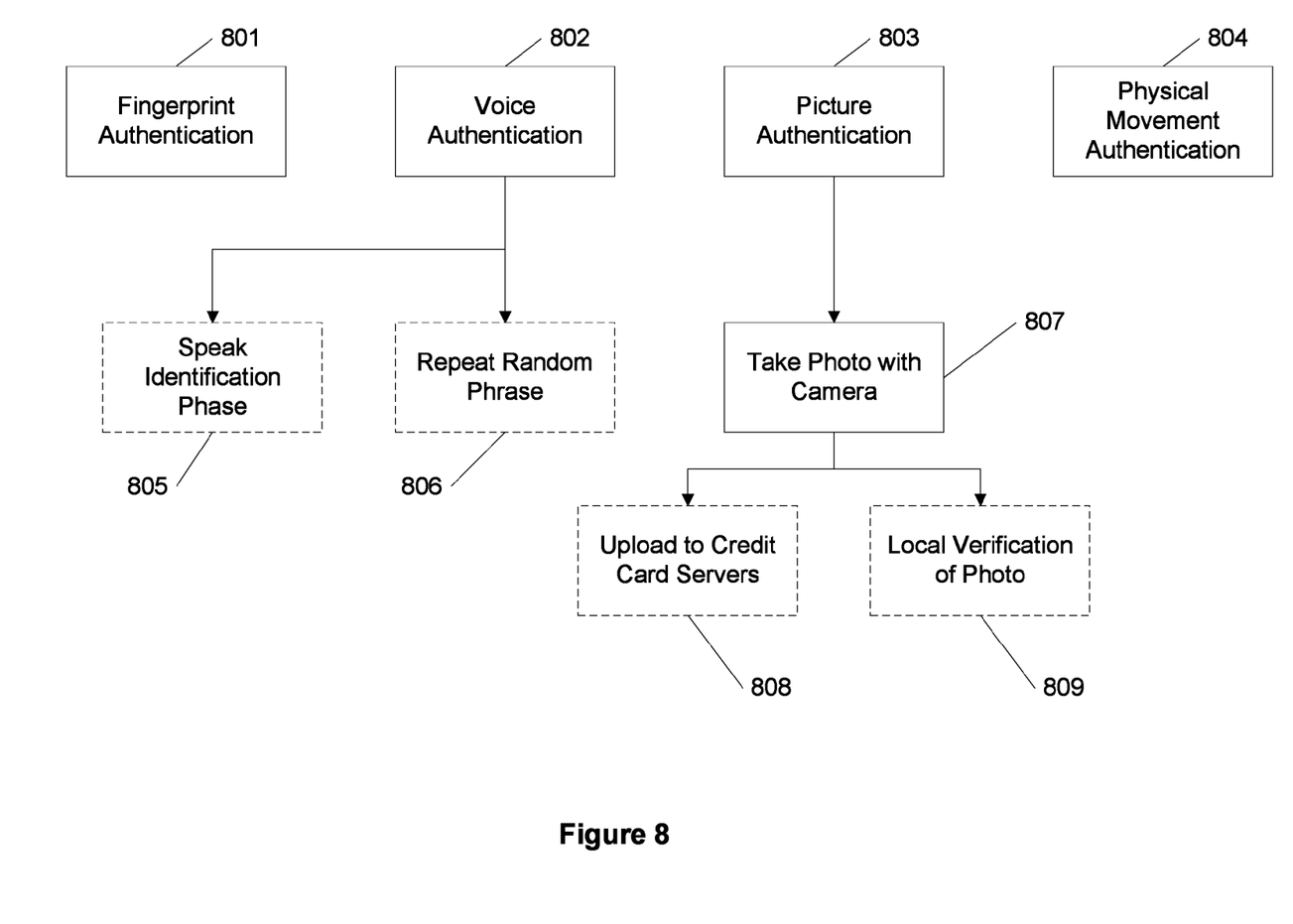
FIG. 8 shows various authentication procedures in accordance with aspects of the present invention.

FIG. 8 shows various authentication procedures in accordance with aspects of the present invention.

In step 801, the authentication procedure may include a fingerprint authentication, for example by using a fingerprint reader on a user's laptop.

In step 802, the authentication procedure may include a voice authentication. For example, the user may use the microphone on the user's smart phone to provide a voice print to be analyzed for authenticating the user. The analysis may occur in the user's computing device or may occur remotely (for example, at the credit card issuing company or at another secure entity).

In step 805, the voice print identification may be a predefined or known phrase previously recorded by the user. Alternatively, in step 806, the system may request a random phrase to be spoken by the user for authentication purposes. Using the random phrase in step 806 may provide greater security by preventing the various users from recording then repeating the standard phrase from procedure 805 with a stolen card number.

In step 803, the system may require a picture of a user for identification and authentication of the user. For instance, the system may use a camera provided with a user's smart phone or a web cam associated with a user's laptop in step 807 to obtain an image of the user's face for comparison purposes. Here, the image of the user may be compared with a previously obtained image of the user to authenticate the user. Optionally, the photo authentication of the user may require a new picture for each online transaction. This optional approach provides an advantage by preventing a criminal from using a static photograph (for example from the user's drivers license) to authenticate the user. In other words, if an image received by the credit card issuing company is identical or within a very small tolerance between the known image and the newly received image of the user, the credit card issuing company may request a new photo or fail to authenticate the user.

In step 808, the system may perform the image analysis of the comparison between the known photo of the user and the new photo of the user on the servers of the credit card company or other trusted entity. It is appreciated that various techniques may be used to provide the new photo to the credit card company's servers. For example, the image may be transmitted via e-mail, SMS, MMS, TCP/IP, and the like.

In step 809, the verification of the new photo may occur locally in the user's cell phone or local computing device.

Finally, in step 804, the user may be asked to perform an action to authenticate himself to the credit card company. For example, the action may be signing a touch sensitive trackpad of a notebook computer or touch sensitive surface of a smart phone, moving a mouse to form the user's signature, moving the user's smart phone in a predefined motion (using accelerometers inside the smart phone), and the like as a means of authentication.

Using these authentication procedures, a user may be authenticated via biometric or other physical identification procedures to permit the use of a credit card for online purchases. It is believed that these identification procedures will enhance the security of online transactions.

Referring again to FIG. 2, user's computing device 202 may further include a communication device/interface 205 as embodied in hardware, software, or a combination. For instance, communication interface/device 205 may be a cellular telephone transceiver, a wireless network application device (for instance, WiFi or WiMAX), BLUETOOTH, IR, and other wireless communication devices.

Communication device/interface 205 may permit user's computing device 202 to communicate with a communication device/interface 213 associated with card issuer 201. The communication pathway between the card issuer 201 and user's computing device 202 may be direct or indirect through one or more servers/routers/bridges/switches and the like. For instance, card issuer 201 and user's computing device 202 may be configured to communicate with each other over both cellular transmission systems as well as over the Internet via a WiFi connection.

Card issuer 201 may include a processing system 214 as known in the art (for instance, a server or farm of servers) and storage system 215 (for instance, large-scale database or cloud-based storage systems as known in the art).

In one or more aspects, card issuer 201 generates one or more card verification values that may be stored in at least one of external secure wallet 203 or internal secure wallet 206.

Figure 3:
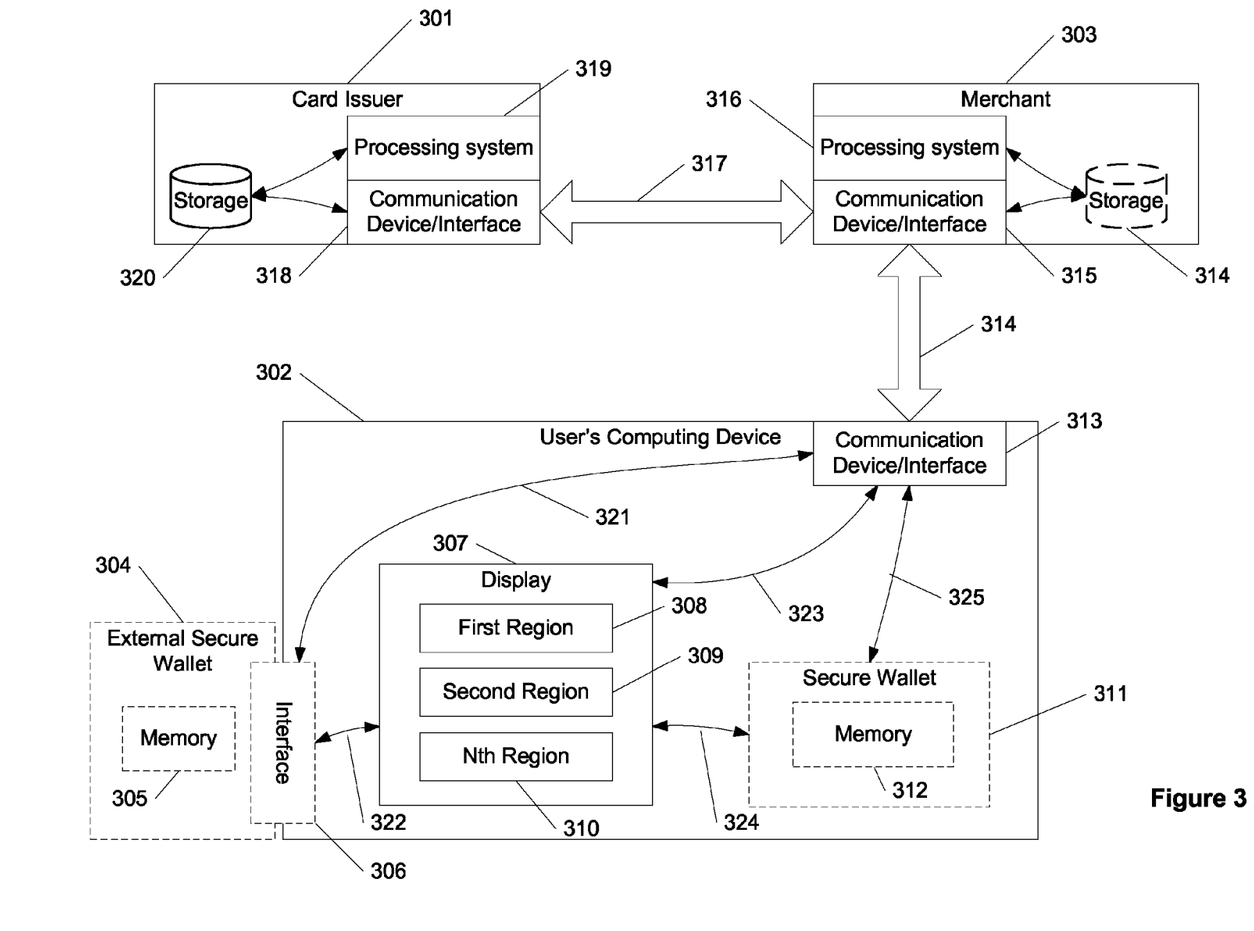
FIG. 3 shows interactions between a card issuer, a merchant, and a user's computing device in accordance with one or more aspects of the invention.

FIG. 3 shows interactions between a card issuer, a merchant, and a user's computing device in accordance with one or more aspects of the invention. FIG. 3 shows various examples of how a merchant that receives credit card information from a user can process that information with a card issuer. Here, card issuer 301, a user's computing device 302, and a merchant 303 are described for handling card-not-present transactions (and/or transactions requiring a CVV).

The user's computing device 302 may include one or more components similar to that of user's computing device 202 of FIG. 2. For aid of explanation, various optional components are shown in broken lines. For instance, user's computing device 302 may include external secure wallet 304 with a memory 305 (and optionally a processor, not shown), interface 306, and internal secure wallet 311 with memory 312 (and optionally a processor, not shown). In FIG. 3, user's computing device 302 includes a display 307 with at least one region in which to display information to a user. Here, three regions are shown for reference (first region 308, second region 309, and Nth region 310). Five internal communication paths are shown within user's computing device 302. It is appreciated that not all of these communication paths will exist in all computing devices 302 as based on the existence of various components. It is appreciated that the "paths" may be actually represented in dedicated hardware (for example, specific buses) in the user's computing device 302 or may be functional in nature (as being sent on one or more system buses or subsystem buses with appropriate headers).

A first path 321 is shown from interface 306 to communication device/interface 313. This first path is the most secure by permitting completely encrypted credit card information and CVVs to be sent to communication device/interface 313.

A second path 322 is shown from interface 306 to display 307. This second path 322 may be used to provide acknowledgment content or information signifying secure content (for instance, a stream of asterisks).

A third path 324 may be provided from internal secure wallet 311 to display 307. This path may be used to forward credit card information and a CVV to a user for display in display 307.

The user may write down or manually copy the displayed credit card information and CVV to credit card information entry fields from a merchant (for example, to a merchant's downloaded page from the Internet, from another network, or into paper documents for subsequent credit card transactions) via a fourth path 323.

A fifth path 325 permits the credit card information and CVV to be transferred directly from internal secure wallet 311 to the merchant 303 via interface 313. In this example, the fifth path 325 may be used to allow internal secure wallet 311 to populate fields on a displayed user interface as relating to a merchant's webpage to minimize errors in attempts to prevent theft of the credit card information and CVV by minimizing content displayed in display 307.

In another example, the user may be authenticated by the user's possession of any secure token in a user's computing device (for instance, in a notebook computer or in a smart phone). Alternatively the user may provide secure information to authenticate the user to the credit card issuing company.

Another feature incorporates GPS technology. Alerts may be set to notify a card holder when the mobile phone is in a particular location conducting a transaction. The card holder may allow or disallow the transaction. The card holder may also set authorizations based on merchant amounts, etc.

Figure 4:
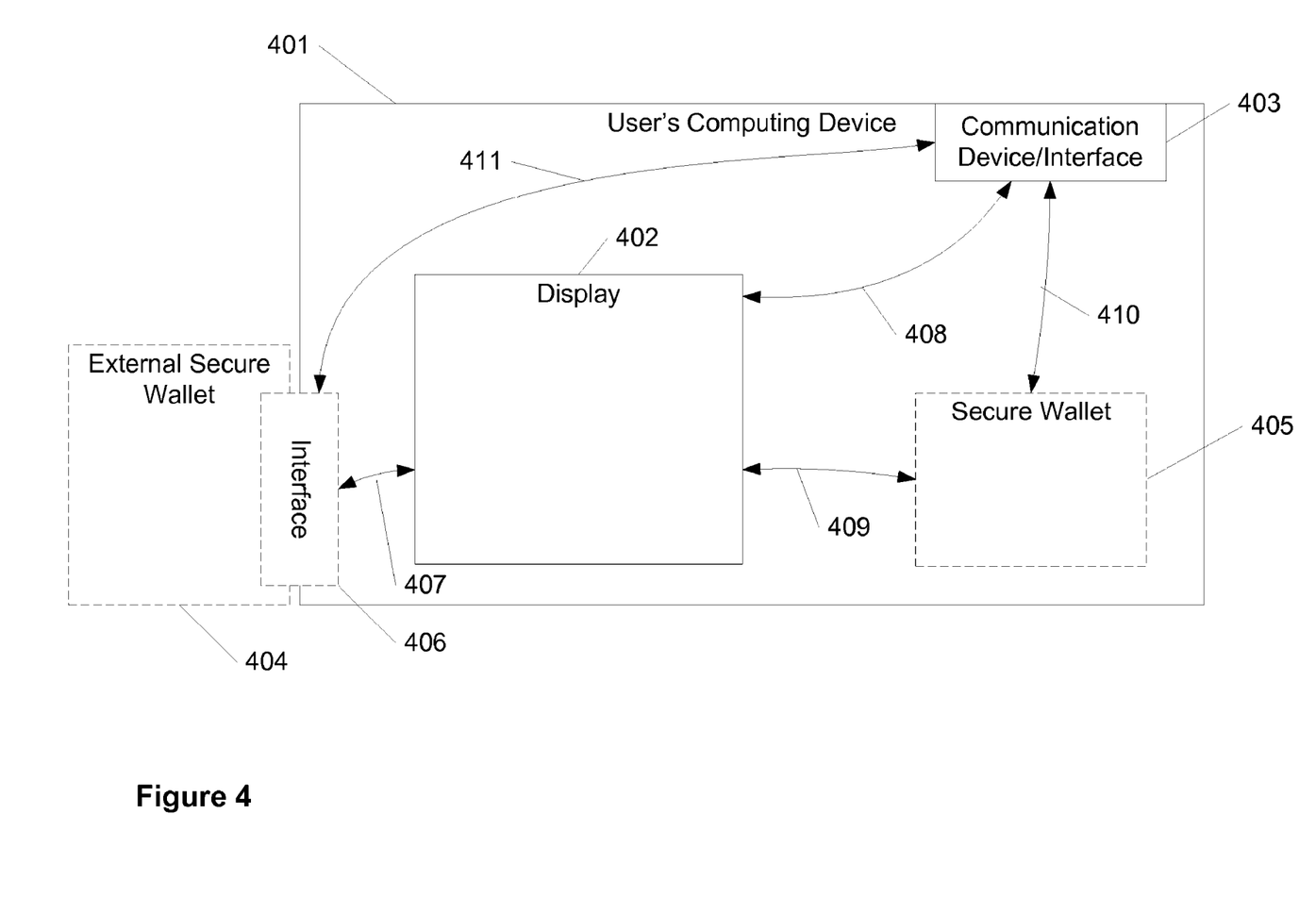
FIG. 4 shows various pathways for secure and unsecured information as accessed through a user's computing device in accordance with one or more aspects of the invention.

FIG. 4 shows a user's computing device 401 with pathways similar to those of FIG. 3. In FIG. 4, user's computing device 401 includes display 402, communication device/interface 403, and may include external secure wallet 404, interface 406, internal secure wallet 405, a first path 411 linking interface 406 and communication device/interface 403, a second path 407 linking interface 406 and display 402, a third path 409 linking internal secure wallet 405 and display 402, a fourth path 408 linking display 402 and communication device/interface 403, and a fifth path 410 linking internal secure wallet 405 and communication device/interface 403.

To enhance security, the credit card number and additional information (expiration date and CVV code) may be stored in a secure storage location either local to the user or remote. For instance, this information may be locally stored on a removable memory that may be attached to the user's computing device. Alternatively, the information may be remotely retrieved from the credit card issuing company or from another secure source.

Figure 5:
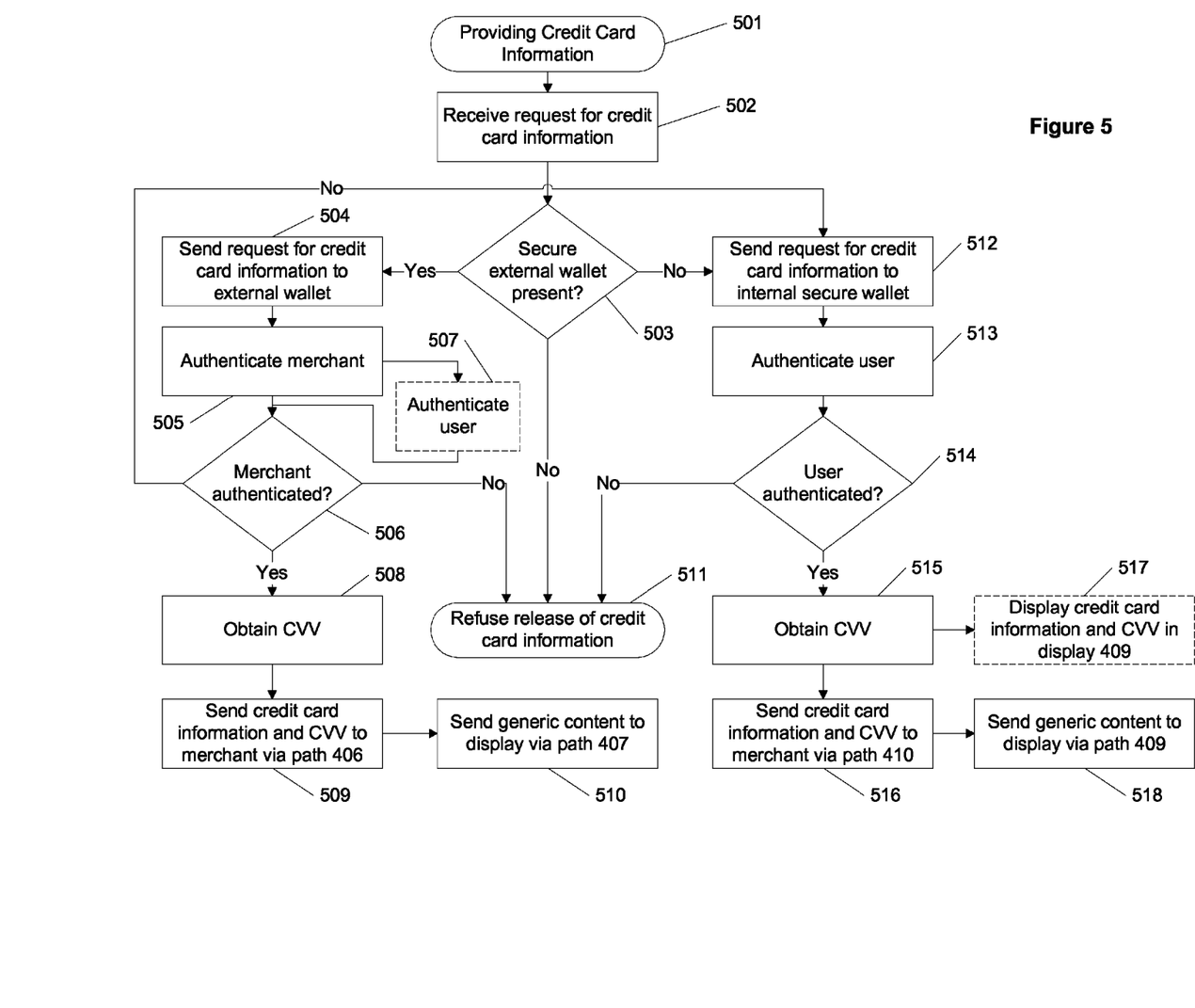
FIG. 5 shows various processes for obtaining credit card information in accordance with one or more aspects of the invention.

FIG. 5 illustrates various processes for providing credit card information using the pathways of FIG. 4. In step 501, a user desires to provide credit card information to a merchant. In step 502, the user's computing device 401 receives a request from the user to provide credit card information in a form usable by a merchant (for instance, to be electronically transmitted to the merchant or displayed to a user who can forward the information to a merchant). In step 503, the user's computing device 401 determines if an external wallet is present. If yes, the user's computing device 401 sends a request for credit card information to the external wallet in step 504. In step 505, the external wallet attempts to authenticate the merchant. For instance, the external wallet may determine whether the merchant is listed in a predetermined set of good merchants or bad merchants, or may attempt to authenticate credentials from the merchant has passed to the external wallet. For instance, an external wallet may attempt to check an online resource (for example, a Yellowpages™ or Whitepages™ listing) for information to authenticate the merchant.

Optionally, the external wallet may attempt to authenticate the user as well in step 507.

If the merchant has been authenticated in step 506 (as well as the user in step 507 if this step is used), then the external wallet may obtain a CVV in step 508. The external wallet may then forward the credit card information and CVV to merchant via path 406 in step 509. Finally, the external wallet may send generic content to display in the user's computing device 401's display screen via path 407 in step 510.

If the merchant (and/or user) was not authenticated in step 506, then the user's computing device may refused to release credit card information to the user and/or merchant in step 511.

Alternatively, if the merchant was not authenticated in step 506 (for example, no online listing available for the merchant), or if an external wallet is not present, then the user may attempt to use an internal secure wallet to obtain the credit card information and CVV in step 512. Here, the user's computing device 401 attempts to authenticate the user in step 513. If the user is authenticated from step 514, then the secure wallet obtains the credit card information and CVV in step 515. The secure wallet next sends the credit card information and CVV to the merchant via path 410. Next, the secure wallet sends generic content to the display via path 409. Alternatively, from step 515, upon user request (and possible further authentication), the secure wallet displays credit card information and a CVV in display via path 409.

The user may then copy the information in display (from step 517) into a merchant's webpage or into forms for future credit card transactions.

Figure 6:
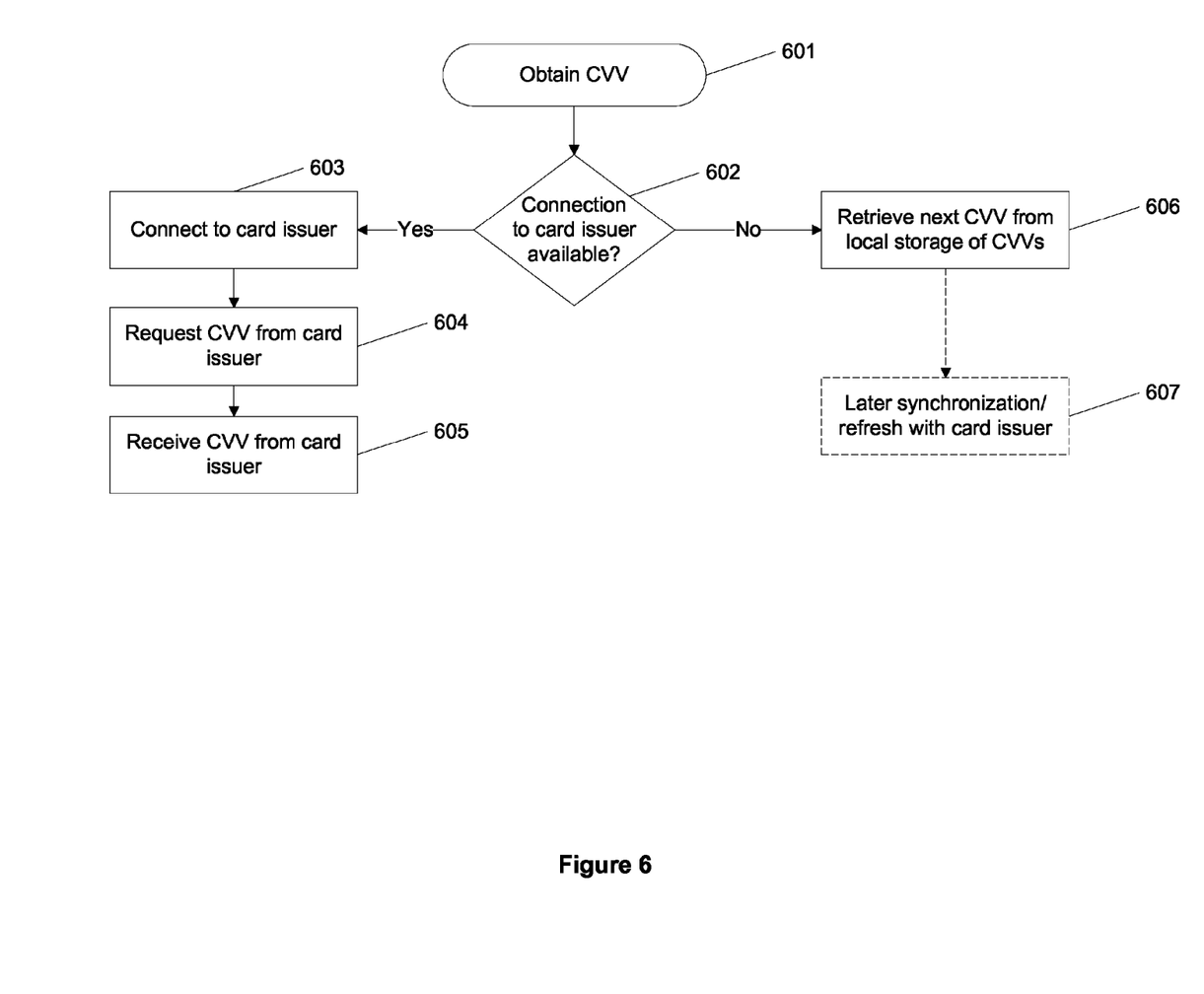
FIG. 6 shows various processes for obtaining a card verification value in accordance with one or more aspects of the invention.

FIG. 6 shows various processes for obtaining a card verification value in accordance with one or more aspects of the invention. In step 601, a secure wallet (either internal or external) is requested to obtain credit card information including a CVV.

In a first example, the system determines if a connection to a card issuer is available in step 602 (the prior obtaining of the CVV may occur at an earlier time, when connectivity was available, and the current step 602 may occur at the next burst of connectivity). If yes, then the secure wallet connects to the card issuer in step 603. The secure wallet authenticates itself to the card issuer, and requests a CVV in step 604. In step 605, the secure wallet receives the CVV from the card issuer and forwards it as described in FIG. 5.

If no connection to a card issuer is available in step 602, then the secure wallet obtains a stored CVV from a local storage of one or more CVVs in step 606 and forwards the CVV as described in FIG. 5. In some embodiments, the refresh and coordination with the card issuer can occur without connectivity, using similar CVV generation engines running at the issuing bank and the consumer's device (e.g., smart phone, PC, USB device, etc.).

Later, when the secure wallet is synchronized with the card issuer, used CVVs may be replaced with new CVVs as needed. Alternatively, all CVVs previously sent to the secure wallet may be replaced with new CVVs, irrespective of whether the previous CVVs were used in a transaction.

In a second example, a secure wallet may not determine if a connection to a card issuer is available as shown in step 602. Rather, a secure wallet may only obtain a CVV from its local storage of one or more CVVs.

In yet a further example, the CVV code may be locally generated based on an algorithm in synchronization with a corresponding algorithm in the credit card issuing company or in the secure other source. In this example, each CVV provided by the user's computing device may be only valid for a short period of time before a revised CVV is required.

Figure 7:
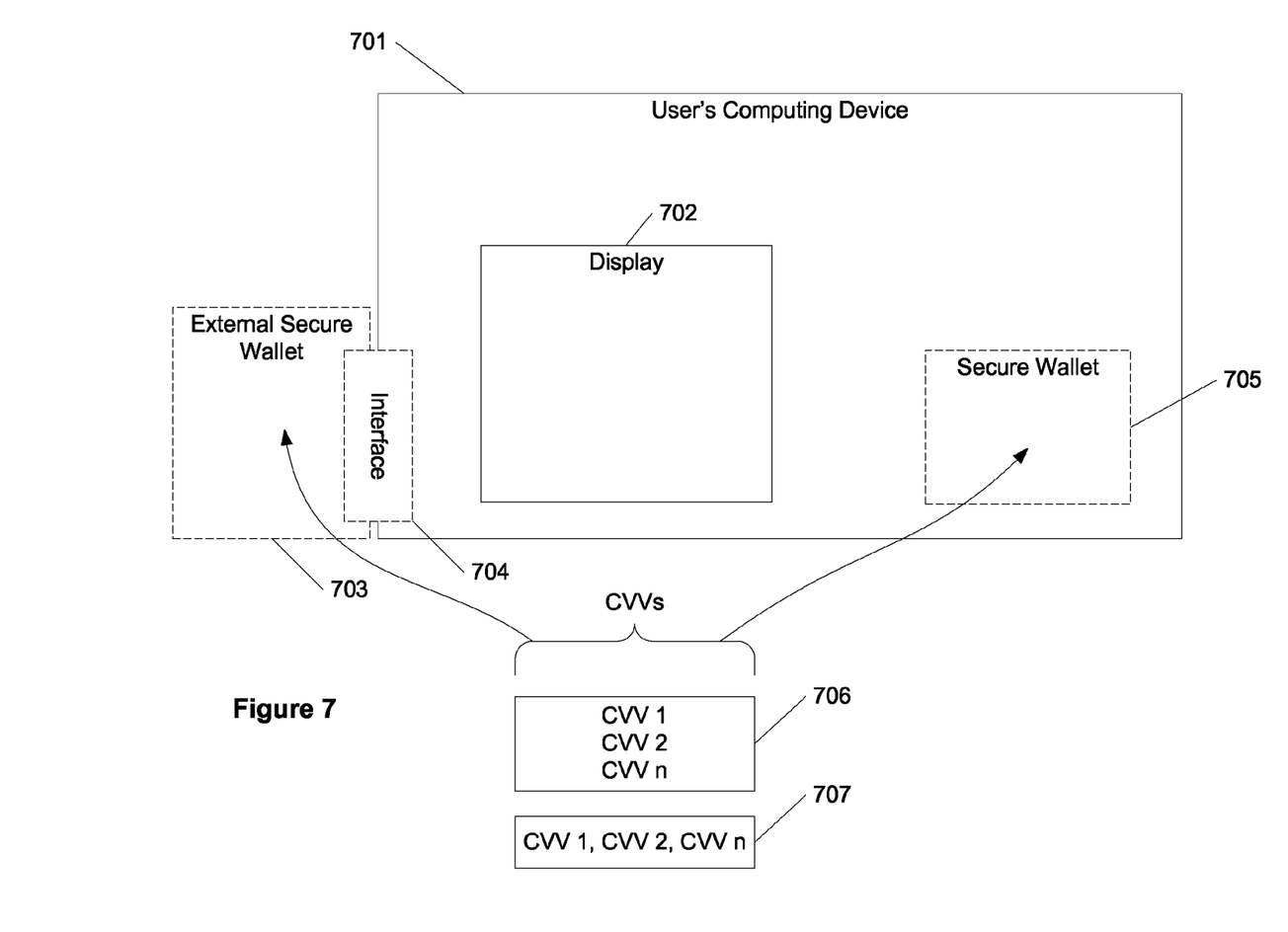
FIG. 7 shows various examples for how to store multiple card verification values in accordance with one or more aspects of the invention.

FIG. 7 shows various techniques of storing CVVs in one or more secure wallets. FIG. 7 includes a user's computing device 701 with a display 702. At least one of external secure wallet 703 (and interface 704) and internal secure wallet 705 is available to users computing device 701. CVVs may be stored as a list with individual entries as shown list 706. Alternatively, CVVs may be stored as a single string where each CVV is present as shown in string 707. The internal or external secure wallet may then parse the string 707 for the next (or random) CVV and provided as needed. Such a code-within-a-code may help reduce risk of man-in-the-middle attacks.

The features above are simply examples, and variations may be made as desired. For example, the CVV may be a static code assigned for the lifetime of a user's card. Alternatively, the CVV may be dynamically generated for each use of the card, different CVV codes can be generated for different transaction dollar values or limits, or for a predetermined duration of time (e.g., minutes, days, weeks, months, years, etc.).

We claim:

1. A method comprising:
   receiving, by a computing device, a request to associate a card with a secure wallet on the computing device;
   storing, in the secure wallet on the computing device, information related to card information, the information including an account identifier that is different from a card number printed on the card;
   storing, on the computing device, a token associated with a user of the computing device and a card issuer of the card;
   receiving, by the computing device, a request to provide, in connection with a purchase from a merchant, the information stored in the secure wallet on the computing device;
   responsive to receiving the request to provide the information, requesting authentication from the user;
   authenticating the user for access to the secure wallet;
   generating new one-time-use information related to the information stored in the secure wallet; and
   responsive to the authenticating, providing, from the computing device to the merchant via an electronic transmission, in connection with the purchase, the new one-time-use information related to the information stored in the secure wallet.

2. The method of claim 1, wherein generating the new one-time-use information related to the information stored in the secure wallet comprises generating a new card verification value,
wherein providing the new one-time-use information related to the information stored in the secure wallet comprises providing the new card verification value, and
wherein the method comprises designating the new card verification value as used.

3. The method of claim 1, comprising:
storing, in the secure wallet on the computing device, one or more card verification values related to the card information.

4. The method of claim 1, wherein authenticating the user for access to the secure wallet comprises authenticating, using a fingerprint of the user, the user for access to the secure wallet.

5. The method of claim 1, comprising:
requesting a phrase spoken by the user;
receiving, via a microphone of the computing device, the phrase spoken by the user; and
based on the phrase spoken by the user, analyzing a voice print of the user,
wherein the authenticating the user is based on the analyzing the voice print of the user.

6. The method of claim 5, wherein requesting the phrase spoken by the user comprises displaying a random phrase to be spoken by the user.

7. The method of claim 1, comprising:
capturing, using a camera of the computing device, an image of the user;
determining whether the image of the user is a new image captured in connection with the purchase;
determining whether the image of the user matches a previously obtained image of the user;
in a case that the image of the user matches the previously obtained image of the user, and the image of the user is the new image captured in connection with the purchase, proceeding with requesting the purchase; and
in a case that the image of the user does not match the previously obtained image of the user, or the image of the user is not the new image captured in connection with the purchase, not proceeding with requesting the purchase.

8. The method of claim 1, comprising:
displaying, by the computing device, a confirmation of providing, to the merchant in connection with the purchase, the new one-time-use information.

9. The method of claim 1, comprising:
displaying, by the computing device, content related to the card information.

10. The method of claim 1, comprising:
capturing, via a touch-sensitive surface of the computing device, a signature of the user; and
providing, in connection with the purchase, the signature of the user.

11. The method of claim 1, comprising:
storing the information related to the card information in an encrypted state in the secure wallet on the computing device.

12. The method of claim 1, comprising:
determining a location of the purchase from the merchant;
alerting the user of the location of the purchase from the merchant; and
after the alerting the user of the location of the purchase from the merchant, receiving authorization from the user to proceed with the purchase from the merchant.

13. Non-transitory computer-readable media storing executable instructions that, when executed by at least one processor, cause a system to:
receive a request to associate a card with a secure wallet on the system;
store, in the secure wallet on the system, information related to card information, the information including an account identifier that is different from a card number printed on the card;
store a token associated with a user of the system and a card issuer of the card;
receive, by the system, a request to provide, in connection with a purchase from a merchant, the information stored in the secure wallet on the system;
responsive to receiving the request to provide the information, request authentication from the user;
authenticate the user for access to the secure wallet;
generate new one-time-use information related to the information stored in the secure wallet; and
responsive to authenticating the user, provide via an electronic transmission to the merchant, in connection with the purchase, the new one-time-use information related to the information stored in the secure wallet.

14. The method of claim 1, comprising:
designating the new-one-time-use information related to the information stored in the secure wallet as used.

15. The method of claim 1, wherein providing, to the merchant via the electronic transmission, in connection with the purchase, the new one-time-use information related to the information stored in the secure wallet comprises sending encrypted credit card information.

16. The method of claim 1, comprising:
determining whether the merchant is in a predetermined set of merchants; and
authenticating the merchant.

17. The method of claim 1, comprising:
storing, in the secure wallet on the computing device, information about a supplemental account different from a credit card account associated with the card.

18. A system comprising:
at least one processor; and
non-transitory memory storing executable instructions that, when executed by the at least one processor, cause the system to:
receive a request to associate a card with a secure wallet on the system;
store, in the secure wallet on the system, information related to card information, the information including an account identifier that is different from a card number printed on the card;
store a token associated with a user of the system and a card issuer of the card;
receive, by the system, a request to provide, in connection with a purchase from a merchant, the information stored in the secure wallet on the system;
responsive to receiving the request to provide the information, request authentication from the user;
authenticate the user for access to the secure wallet;
generate new one-time-use information related to the information stored in the secure wallet; and
responsive to authenticating the user, provide via an electronic transmission to the merchant, in connection with the purchase, the new one-time-use information related to the information stored in the secure wallet.

19. The system of claim 18, wherein authenticating the user for access to the secure wallet comprises authenticating, using a fingerprint of the user, the user for access to the secure wallet.

20. The non-transitory computer-readable media of claim 13, wherein authenticating the user for access to the secure wallet comprises authenticating, using a fingerprint of the user, the user for access to the secure wallet.

\* \* \* \* \*